United States Patent [19]

Bilden et al.

[11] Patent Number: 6,012,016

[45] Date of Patent: Jan. 4, 2000

[54] METHOD AND APPARATUS FOR MANAGING WELL PRODUCTION AND TREATMENT DATA

[75] Inventors: Dean Bilden, The Woodlands, Tex.; Ron Browning, Green River, Wyo.; Dave Cramer, Littleton, Colo.; Larry Harrington, Spring, Tex.; Mark E. Hoel; Bill Holcomb, both of The Woodlands, Tex.; Dave Mack, Edmond, Okla.

[73] Assignee: BJ Services Company, Houston, Tex.

[21] Appl. No.: 08/921,114

[22] Filed: Aug. 29, 1997

[51] Int. Cl.[7] .................................................. G01V 1/40
[52] U.S. Cl. .................................................. 702/12; 702/6
[58] Field of Search .................................. 702/12, 6, 14, 702/16; 367/38; 382/100; 395/100; 340/853

[56] References Cited

U.S. PATENT DOCUMENTS

| | | | |
|---|---|---|---|
| 4,686,625 | 8/1987 | Bryan | 364/422 |
| 5,202,829 | 4/1993 | Geier | 364/449 |
| 5,237,539 | 8/1993 | Selman | 367/69 |
| 5,513,150 | 4/1996 | Sicking et al. | 367/73 |
| 5,555,531 | 9/1996 | Booth et al. | 367/15 |
| 5,719,949 | 2/1998 | Koeln et al. | 382/113 |
| 5,721,538 | 2/1998 | Tubel et al. | 340/853.4 |
| 5,803,167 | 9/1998 | Bussear et al. | 166/53 |
| 5,838,906 | 11/1998 | Doy et al. | 395/200.32 |

OTHER PUBLICATIONS

Atkin GeoMack Consulyancy Ltd. Author, Bruce atkin, Internet web page [www.atkingeomack.com], Jun. 15, 1995.

Geomap Company, Products and Servives, Internet web page, [www.geomap.com/geonews] all Jun. 1, 1997.

Correlations Company, GViz Software (C), 1995 oil field modeling, internet, [www.correlations.com], Feb. 12, 1997.

Wattenberg Field, Weld County Colorado; by Kirk A. Barrell; source, Geodynamic Solutions Inc., Aug. 1, 1999.

*Primary Examiner*—Christine K Oda
*Assistant Examiner*—Victor J. Taylor
*Attorney, Agent, or Firm*—Vinson & Elkins L.L.P.

[57] ABSTRACT

The present invention provides a method and apparatus for optimizing the treatment of a well. Initially, data from numerous sources is collected. Some of the data represents the location of objects found on a common map, e.g., rivers, towns, county lines, highways, etc. Another part of the data is data relating to a well. This data includes a wide variety of information that can be useful in determining how to treat a nearby well. This data is then integrated where it can be easily accessed by a user. Next, the user, using a geographic interface operating on a data processing system, selects a geographic region about which they are interested. The geographic interface assists the user in selecting the appropriate area. The user then uses the geographic interface to select some number of wells in the region of interest. This initial list of wells is refined by performing a SQL search of the initial list to select only the wells which have features or characteristics of interest to the user. Once a final list of wells is developed, the user can analyze the list to determine the optimal treatment for a well located proximate to the wells in the final list.

25 Claims, 6 Drawing Sheets

METHOD AND APPARATUS FOR MANAGING WELL PRODUCTION AND TREATMENT DATA

BACKGROUND OF THE INVENTION

1. Technical Field

The present invention relates generally to using a data processing system to provide information for optimizing treatment of oil and gas wells. More specifically, the present invention relates to using a geographic user interface system operating on a data processing system to aid in the analysis of well production and treatment data. Also, the present invention allows for the comparison of a company's proprietary data with that of a competitor's data, existing on a publicly available database, from an economic standpoint.

2. Description of the Related Art

Well service companies are in the business of treating oil and gas wells to enhance or control their production. Well service companies also prospectively plan the treatments for groups of wells which have not yet been drilled. Treatments such as well cementing ("a cement job"), pumping acid into a formation ("an acid job"), pumping proppant into a formation ("a frac job"), and using coiltubing and production enhancing chemicals are several well known treatments performed when servicing a well. However, these and other treatments not mentioned are expensive and must be used selectively in order to render the recovery of petroleum products from a treated well cost effective. Complicating this matter further is the fact that each well is unique and will respond to treatments in different ways. How a well responds to a given treatment depends on an almost infinite number of factors, such as the geologic and reservoir parameters for the well, and the well's production and completion history. Each job must be specifically designed to account for the unique characteristic of the well. Thus, there is no one treatment program or set of treatments which can regularly be used in a cost effective manner to treat wells in general.

To combat this problem, well service companies have traditionally relied upon experienced individuals who acquire a "feel" for how to treat wells in a given area. In many instances, wells which are located next to one another share important geologic characteristics. For instance, the geology of the rock surrounding a group of closely spaced wells may be similar, and these wells may be drawing the same petroleum product from the same reservoir. In these instances, treatments employed on one well may be highly predictive of how that same treatment would work on a neighboring well. Individuals who have spent years in the same area come to develop an intuition or experience about how best to treat a well in the area with which they are familiar.

Although these individuals can be fairly accurate in predicting how a well in the area with which they are familiar will respond to a given treatment, well service companies understand that relying upon the memory of a small group of individuals is not an ideal way to conduct business. When an individual leaves the company, for whatever reason, the company is deprived of that individual's expertise about the wells in a given area.

In addition to relying upon experienced individuals, well service companies, from time to time, gather large amounts of data for wells in a given area, and analyze this data to determine the best treatment for the wells in that area. Extensive data exists for almost every oil and gas well found in the United States and Canada. Various state, provincial, and federal regulatory agencies regularly require that data about the production and treatment of wells be submitted to them. This data then becomes public knowledge after the well becomes non-confidential. For several years, the Petroleum Information Company (PI) and others have collected this data from the various state, provincial and federal regulatory agencies, and well operators. Once collected, PI and the other companies insert this data into their own large databases. Oil companies commonly access these databases to aid their exploratory and reservoir engineering tasks. For a fee, well service companies can also access these databases to retrieve information for a group of wells. However, to date, these databases have rarely been used by well service companies to design well treatments, as there has been no way to integrate or organize data from private and public sources into a single database structure.

Well service companies also collect an extensive amount of data for each well they treat. The data collected by the well service companies is much more detailed for any given well than the data collected by PI, and hence, is much more useful.

When gathering information about a group of wells, well service companies will be able to obtain data from a company such as PI, in addition to any data they have on-hand regarding their treatment of wells in the area. This data can be organized and presented to an engineer for his analysis.

A large amount of data for a group of wells can be collected in this manner. However, performing an effective analysis of data in this form is difficult at best. The data is often contained on several hundred or thousands of sheets of paper. Due to this large amount of paper, analyzing the most relevant information is difficult. Also, the spatial relationships between a group of wells are difficult to visualize when the location of the wells is simply specified by sets of coordinates.

Further, other wells are often overlooked, as it is assumed that the best information on how to treat a given well comes from the wells around it. While this is often the case, wells are sometimes discovered with characteristics very different from those of its neighbors. In these situations, the best information about how to treat the well may come from an examination of wells located some distance away from the well under study. These distant wells may share important characteristics with the well under study, but may be overlooked because the engineer was only looking at nearby wells, as the current industry practice is to focus only on neighboring wells.

Thus, a system which can manage well data originating from several sources is needed. This system should allow a user to quickly and easily review the production and treatment data available for a set of wells. This system should also provide the user with a display which allows the user to view the location of surrounding wells relative to the well under study. This display should allow the user to manipulate and query the wells surrounding the well under study to determine the surrounding wells' production and treatment characteristics. Further, this system should allow a user to engage in a new methodology of determining the best treatment for a well.

Further, this system should allow a search of all past or distant wells so a user can compare the relevant characteristics of these wells to the well under study.

Finally, this system should allow a well service company to compare its internal data with data from well treatments performed by itself and others, so the well service company can asses the relative cost and economic efficiency of its well treatments in comparison to other well treatments which have been performed.

SUMMARY OF THE INVENTION

It is therefore one object of the present invention to organize and manage well production and treatment information.

It is yet another object of the present invention to provide this information in a manner such that it is easily analyzed and manipulated by a user wishing to determine the production and treatment characteristics of a group of wells.

It is still another object of the present invention to allow for the quick and efficient analysis of the production and treatment information for a group of wells so that recommendations can be made for the treatment of a well located in or near the group of wells.

It is another object of the present invention to allow for comparisons to be made between the internal databases of one well service company and the publicly available database of jobs done by another service company to determine the relative economic effect of each treatment.

These and other objects are achieved as follows. The present invention provides a method and apparatus for optimizing the treatment of a well. Initially, data from numerous sources is collected. Some of the data represents the location of objects found on a common map, e.g., rivers, towns, county lines, highways, etc. Another part of the data is data relating to a well. This data includes a wide variety of information that can be useful in determining how to treat a nearby well. This data is then integrated where it can be easily accessed by a user. Next, the user, using a geographic interface operating on a data processing system, selects a geographic region about which they are interested. The geographic interface assists the user in selecting the appropriate area. The user then uses the geographic interface to select some number of wells in the region of interest. This initial list of wells is refined by performing a SQL search of the initial list to select only the wells which have features or characteristics of interest to the user. Once a final list of wells is developed, the user can analyze the list to determine the optimal treatment for a well located proximate to the wells in the final list.

In another embodiment of the present invention, public well data is combined with nonpublic well data in a data processing system. In addition, geographic information for the areas where the public and non-public well data originated is included. These three sets of data are integrated into a database structure existing in the data processing system. A user then retrieves all of the public, non-public, and geographic well data for a given area. The user can then manipulate this well data for the given area.

In still another embodiment of the present invention, well data is stored in a database structure contained in a data processing system. Next, an initial group of wells is selected using a geographic interface operating on the data processing system. This initial list is then filtered according to user-specified criteria. The resulting final list of wells is then displayed using the geographic interface, thus allowing the user to optimize the treatment for a target well.

In other embodiments, a workstation and server can be programmed to operate according to the methods described above.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
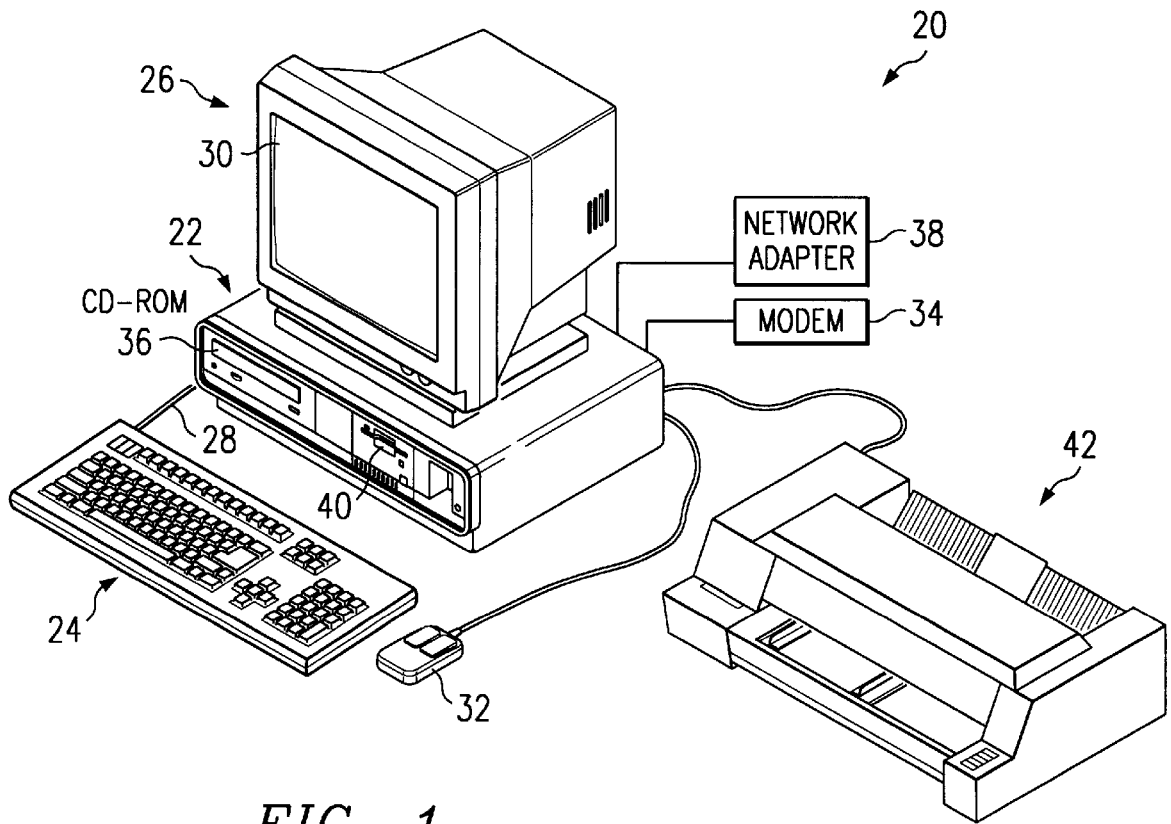
FIG. 1 depicts a data processing system which can be programmed to operate in accordance the present invention.

FIG. 1 depicts data processing system 20, which includes processor 22, keyboard 24, and display 26. Keyboard 24 is coupled to processor 22 by cable 28. Display 26 includes display screen 30, which may be implemented utilizing a cathode ray tube (CRT), a liquid crystal display (LCD), an electroluminescent panel, or the like. Data processing system 20 also includes pointing device 32, which may be implemented utilizing a track ball, joystick, touch sensitive tablet or screen, trackpad, glidepad, or as illustrated in FIG. 1, a mouse. Pointing device 32 may be utilized to move a pointer or cursor on display screen 30. Processor 22 may also be coupled to one or more peripheral devices, such as modem 34, CD-ROM 36, network adaptor 38 and floppy disk drive 40, each of which may be internal or external to the enclosure of processor 22. An output device such a printer 42 may also be coupled to processor 22.

Those persons skilled in the art of data processing system design should recognize that display 26, keyboard 24, and pointing device 32 may each be implemented utilizing any one of several known off-the-shelf components. Data processing system 20 may be implemented utilizing any general purpose computer or so-called personal computer, such as those sold by Compaq, Dell, Apple, Sun, and others.

Figure 2:
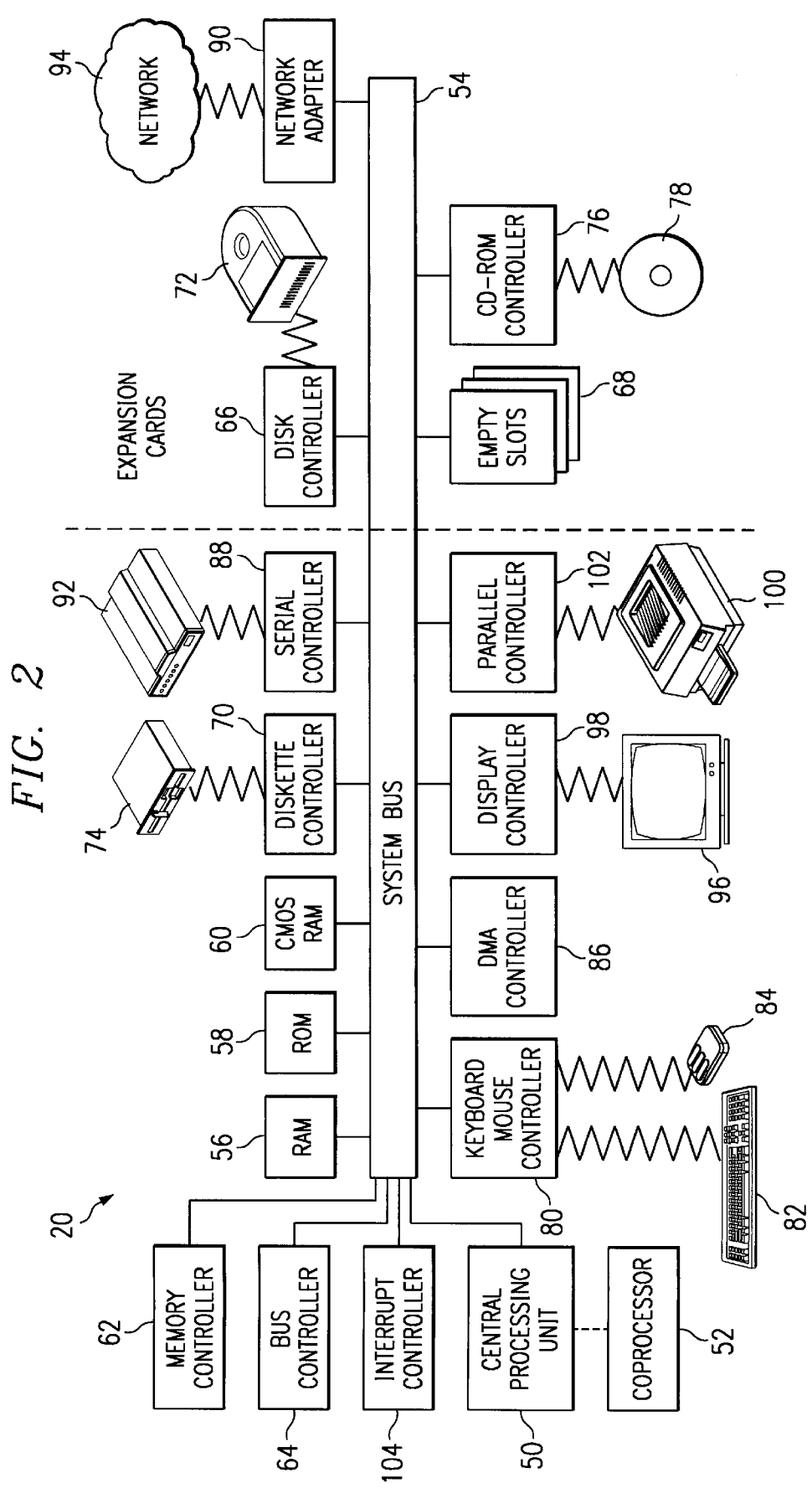
FIG. 2 is a more detailed high level block diagram which further illustrates the major components of the data processing system of FIG. 1.

With reference now to FIG. 2, there is depicted a high level block diagram which further illustrates the major components that may be included in data processing system 20 of FIG. 1. Data processing system 20 is controlled primarily by computer readable instructions, which may be in the form of software, wherever, or by whatever means such software is stored or accessed. Such software may be executed within central processing unit (CPU) 50 to cause data processing system 20 to do work. In many workstations and personal computers, central processing unit 50 is implemented by a single-chip CPU called a microprocessor. An example of such a microprocessor is the microprocessor sold under the trademark "PENTIUM" by Intel Corporation.

Coprocessor 52 is an optional processor, distinct from main CPU 50, that performs additional functions or assists CPU 50. One common type of coprocessor is the floating-point coprocessor, also called a numeric or math coprocessor, which is designed to perform numeric calculations faster and better than general-purpose CPU 50. Recently, however, the functions of many coprocessors have been incorporated into more powerful single-chip microprocessors.

CPU 50 fetches, decodes, and executes instructions, and transfers information to and from other resources via the computer's main data-transfer path, system bus 54. Such a system bus connects the components in data processing system 20 and defines the medium for data exchange. System bus 54 typically includes data lines for sending data, address lines for sending addresses, and control lines for sending interrupts and for operating the system bus. In some embodiments, system bus 54 uses the same lines for both data and address communications. An example of such a system bus is the PCI (Peripheral Component Interconnect) bus. Many system busses provide a function called bus arbitration that regulates access to the bus by extension cards, controllers, and CPU 50. Devices that attach to such a system bus and arbitrate to take-over the bus are called bus masters.

Memory devices coupled to system bus 54 include random access memory (RAM) 56, read only memory (ROM) 58, and nonvolatile memory 60. Such memories include circuitry that allows information to be stored and retrieved. ROMs contain sorted data that cannot be modified. Data stored in RAM can be read or changed by CPU 50 or other hardware devices. Nonvolatile memory is memory that does not lose data when power is removed from it. Nonvolatile memories include ROM, EPROM, EEPROM, bubble memory, or batter-backed CMOS RAM. As shown in FIG. 2, such battery-backed CMOS RAM may be utilized to store system configuration information.

Access to RAM 56, ROM 58, and nonvolatile memory 60 may be controlled by memory controller 62 and bus controller 64. Memory controller 62 may provide an address translation function that translates virtual addresses into physical addresses as instructions are executed. Memory controller 62 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

An expansion card or expansion board is a circuit board, that includes chips and other electronic components connected in a circuit, which adds functions or resources to the computer. Typical expansion cards add memory, disk-drive controllers 66, video support, parallel and serial ports, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special-purpose integrated circuits and associated circuitry that direct and control reading from and writing to a hard disk drive 72 and a floppy disk or diskette 74, respectively. Such disk controllers handle tasks such as positioning the read/write head, mediating between the drive and the microprocessor, and controlling the transfer of information to and from memory. A single disk controller may be able to control more than one disk drive.

CD-ROM controller 76 may be included in data processing 20 for reading data from CD-ROMs 78 (compact disk read-only memory). Such CD-ROMs use laser optics rather than magnetic means for reading data.

Keyboard mouse controller 80 is provided in data processing system 20 for interfacing with keyboard 82 and a pointing device, such as mouse 84. Such pointing devices are typically utilized to control an on-screen element, such as a cursor, which may take the form of an arrow having a hotspot that specifies the location of the pointer when the user presses a mouse button. Other pointing devices include the graphics tablet, the stylus, the light pen, the joystick, the puck, the trackball, and the trackpad.

Direct memory access (DMA) controller 86 may be used to provide a memory access that does not involve CPU 50. Such memory access are typically employed for data transfer directly between memory and an "intelligent" peripheral device, such as between memory 56 and disk controller 66.

Communication between data processing system 20 and other data processing systems may be facilitated by serial controller 88 and network adaptor 90, both of which are coupled to system bus 54. Serial controller 88 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 92. A modem is a communications device that enables a computer to transmit information over a standard telephone line. Modems convert digital computer signals to analog signals suitable for communication over telephone lines. Modem 92 may provide a connection to sources of software, such as a server, an electronic bulletin board, and the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers and the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an image setter, a plotter, or a film recorder.

Parallel controller 102 is used to send multiple data and control bits simultaneously over wires connected between system bus 54 and another parallel communication device, such as printer 100. The most common parallel interface is the Centronics interface.

During data processing operations, the various devices connected to system bus 54 may generate interrupts which are processed by interrupt controller 104. An interrupt is a request for attention from CPU 50 that can be passed to CPU 50 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 104 may be required to handle a hierarchy of interrupt priorities and arbitrate simultaneous interrupt requests. Interrupt controller 104 may also be used to temporarily disable interrupts.

Figure 3:
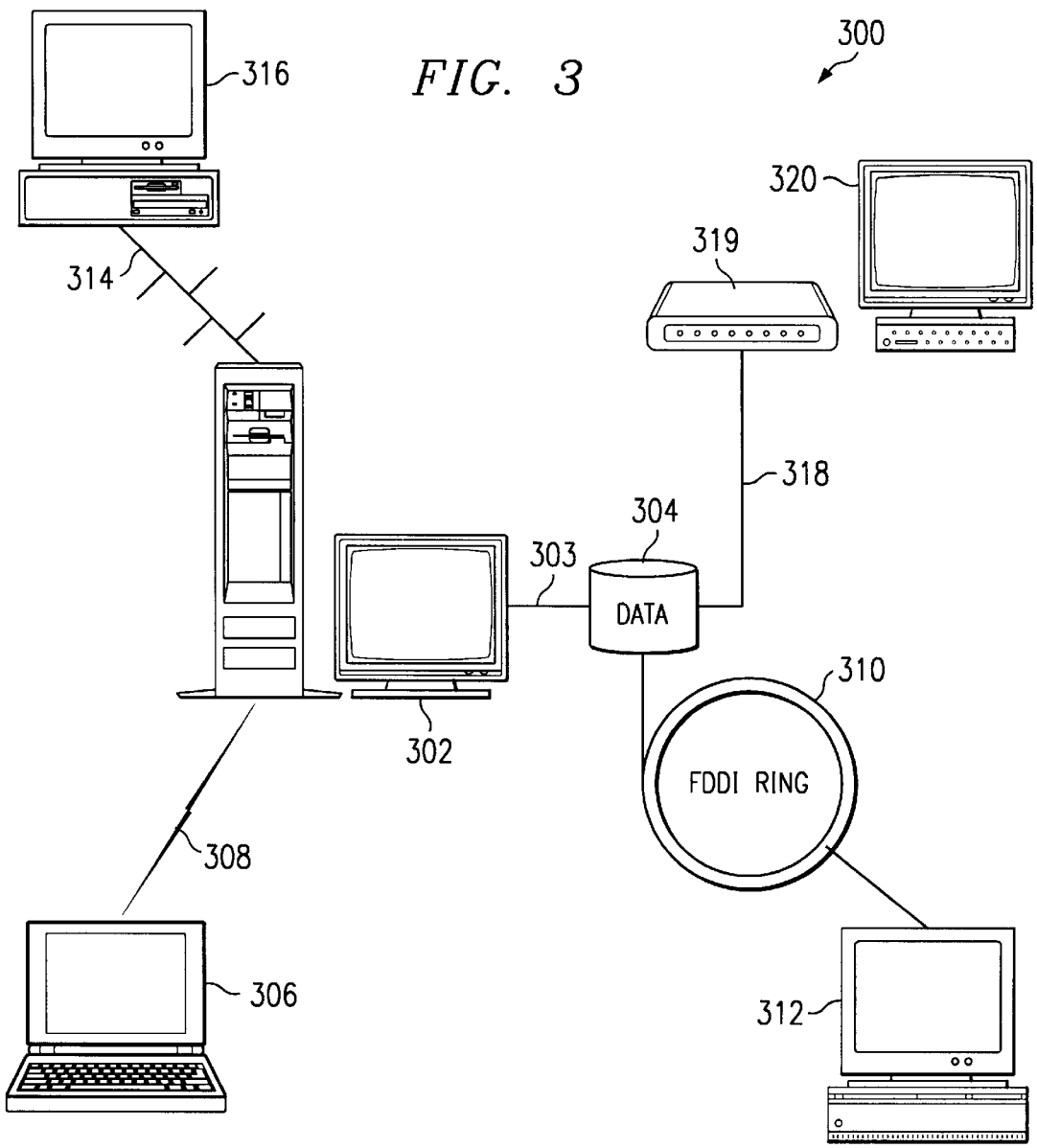
FIG. 3 illustrates a computer network according to the present invention.

FIG. 3 illustrates a computer network according to the present invention. Central to network 300 is server 302 and data storage device 304. Server 302 is connected to data storage device 304 via communications link 303. Server 302 and data storage device 304 operate to supply data to the computing devices connected to network 300. Personal computer 316 is connected to server 302 via Ethernet 314. This connection can be accomplished in many ways, as known in the art. Not shown in FIG. 3 are the bridges, routers, multiplexers, and other intermediate devices which are commonly found in an Ethernet network.

Work station 320 is connected to server 302 using modem 319. Modem 319 allows work station 320 to send and receive digital signals over public telephone network 318. Using a modem allows users to access server 302 when they do not have access to a network connection. However, sending and receiving data using a modem is generally slower and sending than receiving data over a network such as Ethernet network 314.

Laptop computer 306 is connected to server 302 via wireless network 308. This type of connection can be used by persons operating in the field. Wireless network 308 can be implemented using satellites, cellular technology, Packet technology, or other generally available wireless communication protocols.

Computer 312 is connected to server 302 via FDDI network 310. FDDI network 310 is usually implemented with a fiber optic cable. Generally, fiber optic cables have a much greater bandwidth than traditional copper transmission lines.

Figure 4:
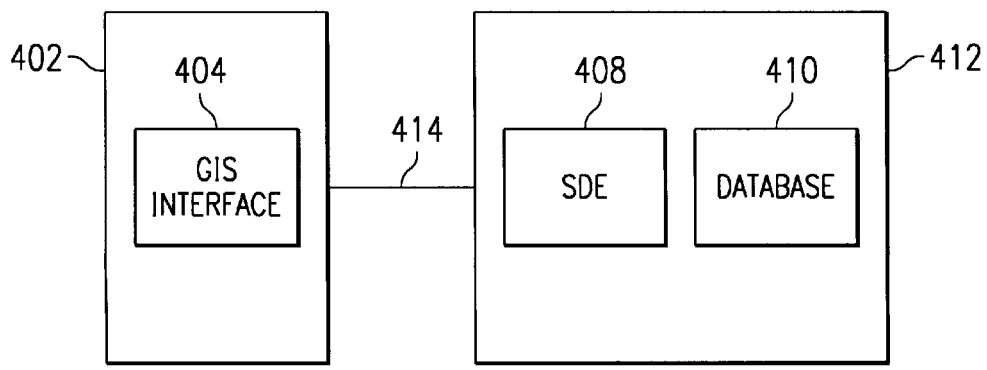
FIG. 4 is a block diagram illustrating a work station and a server, as well as certain software components.

FIG. 4 depicts a work station and server operating according to the present invention. Work station 402 can be a computer such as the one described in FIG. 1. Work station 402 executes software programs which provide for geographic information systems (GIS) interface 404 and a graphical user interface (GUI), such as MICROSOFT Windows '95. Work station 402 is connected to server 412 via communications network 414. Work station 402 must also be able to communicate data at a sufficient rate with server 412 over communications network 414 in order to allow GIS software 412 and the GUI software to execute efficiently.

Figure 5:
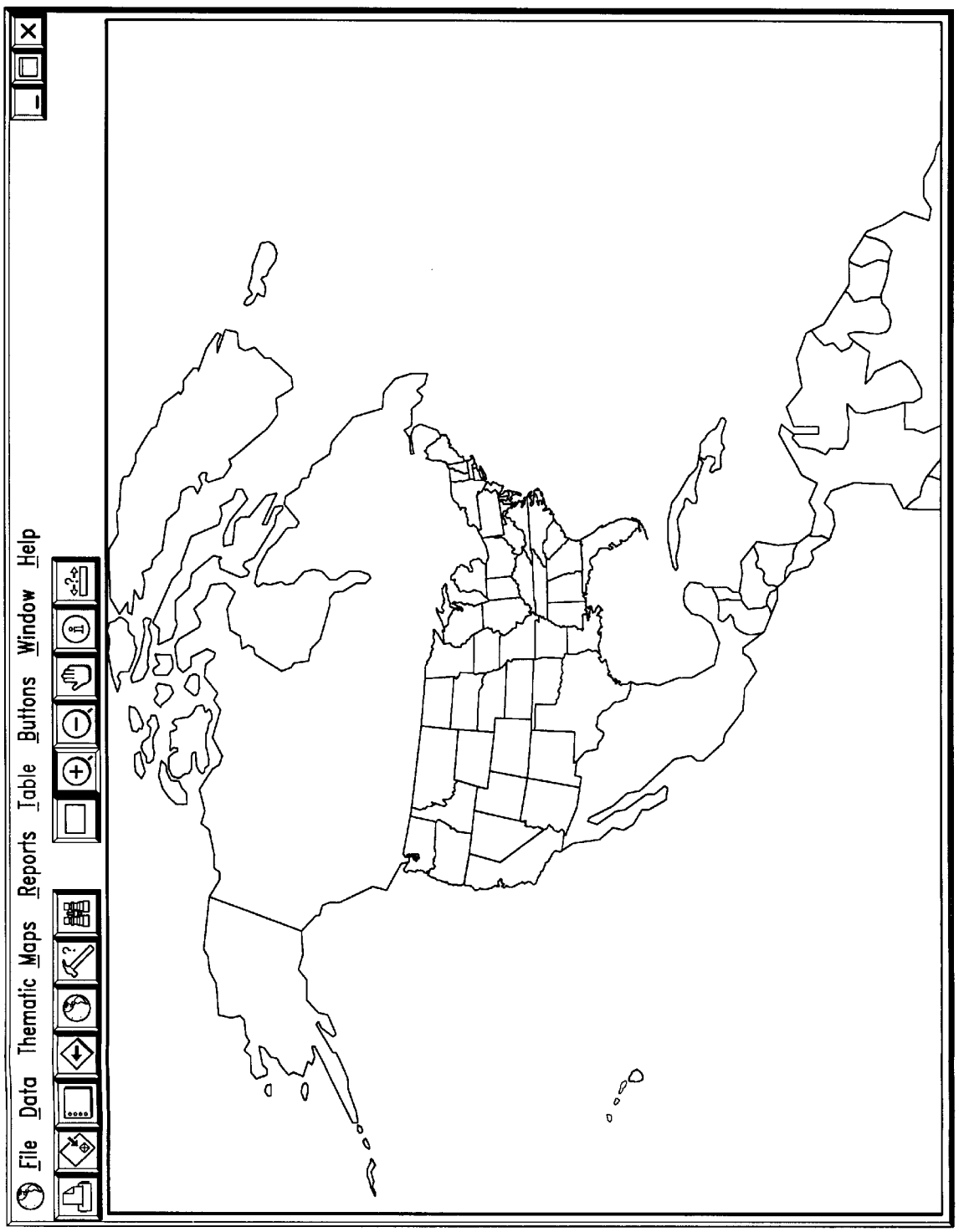
FIG. 5 is a screen display from a workstation operating according to the present invention.
Figure 6:
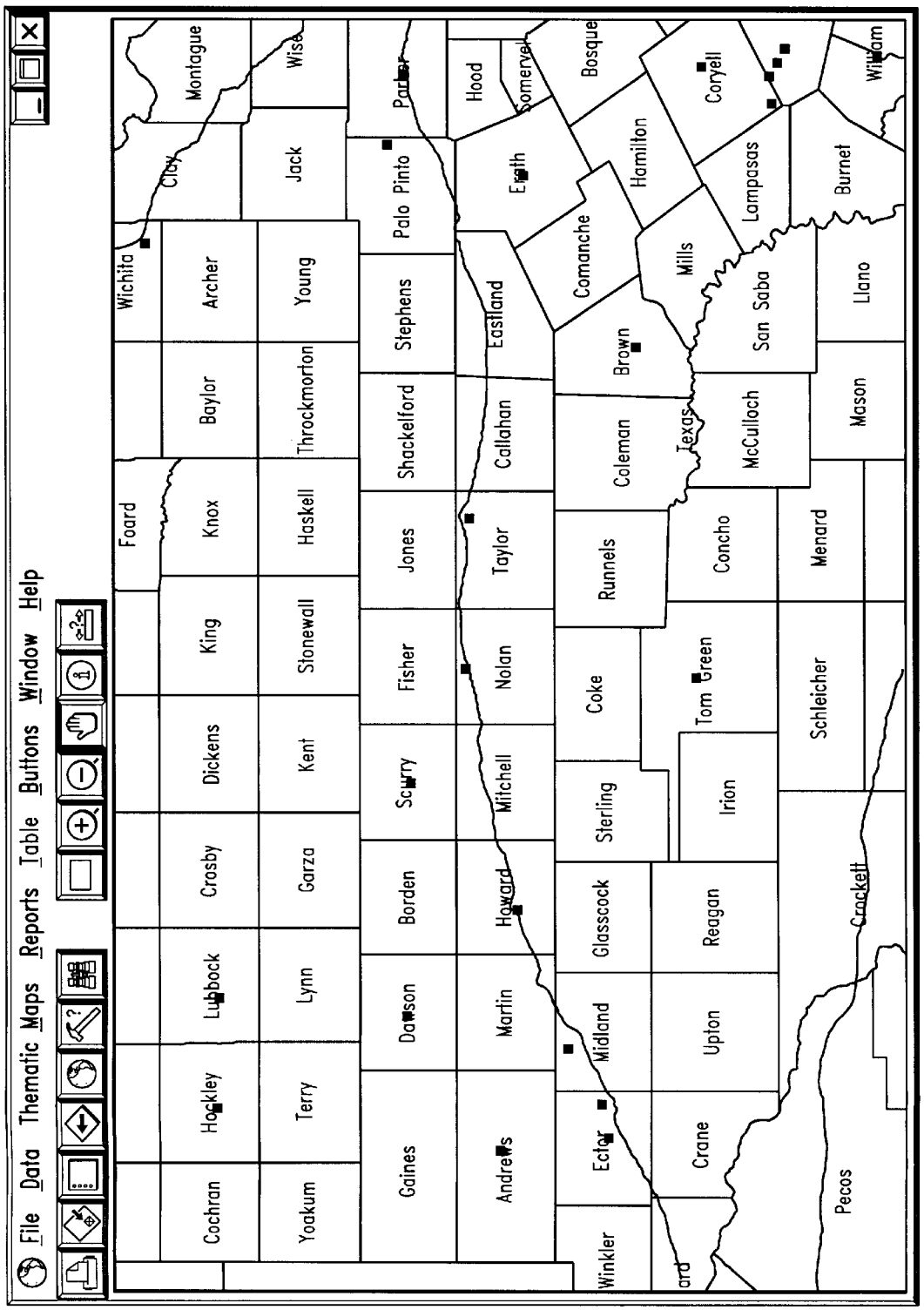
FIG. 6 is an enlargement of a portion of the screen display shown in FIG. 5.

GIS software 404 presents a graphical map of some portion of the earth's surface to a user operating work station 402. At a broad scale, the map displayed by GIS interface 404 can take the form of the map shown in FIG. 5. One of the primary functions of GIS interface 404 is to manage the display of information so that the user is provided with a large amount of easily comprehendible information. GIS interface 404 accomplishes this task by varying the amount of information presented with the amount of surface area being displayed. For instance, the map of the United States shown in FIG. 5 does not illustrate many local features, such as towns, rivers, etc. because the size of these features would be so small, compared to the scale of the map, a user would have difficulty resolving these features. Also, there would be too many of these local features to display. The display would become cluttered and difficult to comprehend if all local features were displayed at this scale. However, the user can direct GIS interface 404 to focus on certain areas and to display these area with varying levels of detail. For instance, the user can direct GIS interface 404 to display an area having the scale shown in FIG. 6. FIG. 6 illustrates a multi-county area within the state of Texas. Since much less surface area is shown in FIG. 6, GIS interface 404 can display more local features, such as local highways, county lines, and rivers, without overwhelming the user.

Figure 7:
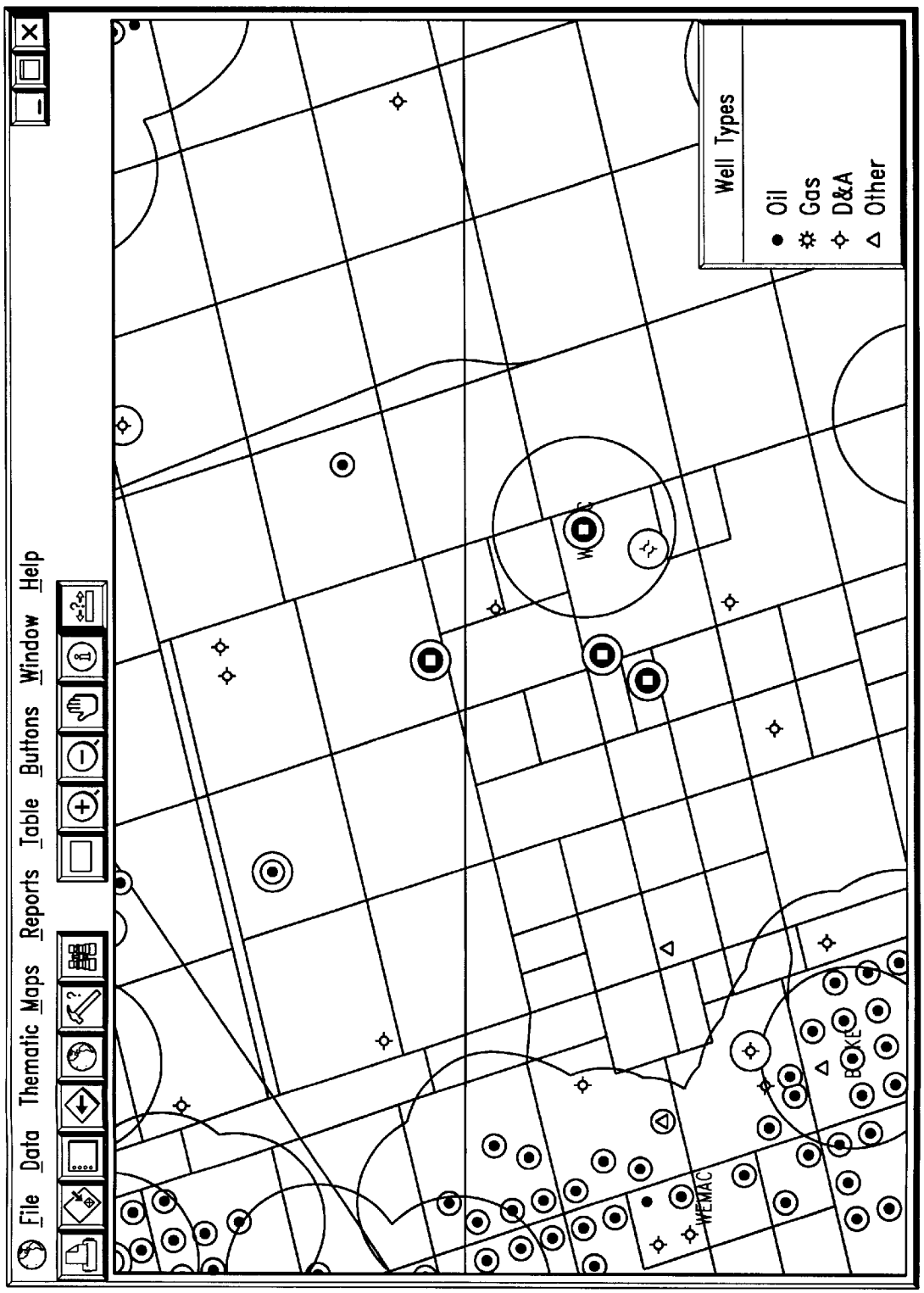
FIG. 7 is an enlargement of a portion of the screen display shown in FIG. 6.

A user operating work station 402 can direct GIS interface 404 to display an area which represents only a few square miles of the earth's surface. Once the user has navigated to this fine a scale, they can begin to manipulate the individual oil and gas wells located in the area. FIG. 7 shows a display illustrating only several square miles. Also seen in FIG. 7 are all of the oil and as wells contained in that area.

GIS interface 404 serves as an interface between a user operating work station 402 and the information contained in server 412. When a user directs work station 402 to display a certain portion of the earth's surface, GIS interface 404 will determine which area the user is requesting to be displayed, and will transmit this information over communications network 414 to server 412. This information is received by spatial database engine (SDE) 408. SDE 408 determines what information GIS interface 404 is requesting, and for what area. SDE 408 then searches database 410 to retrieve this information. For instance, in FIG. 6, the user requested that a certain area of the state of Texas be displayed. GIS interface 404 transmitted the coordinates of the area selected by the user to SDE 408, along with a request for certain information contained in the area. SDE 408 then executed a search of database 410 to retrieve the requested information for the defined area. After retrieving this information, SDE 408 transfers the information to GIS interface 404 as requested.

In a preferred embodiment of the present invention, SDE 408 is a program from Environmental Systems Research Institute (ESRI), located in Redlands, Calif., entitled "SDE Version 2.1." SDE 408 operates in conjunction with Oracle Relational Database Management System, Version 7, also located on server 412 to manage database 410.

Database 410 includes geographic information (e.g., state and county lines, rivers, towns, highways, etc.) about areas which can be displayed using GIS interface 404. This geographic information is supplied by ERSI with SDE 408. In addition, database 410 includes oil and gas well data. This well data comes from several sources. Part of the oil and gas well data comes from Petroleum Information's Petroleum Information Data Model (PIDM) database. (It should be noted that other companies maintain databases similar to the PIDM database, and that these databases can be used in place of, or as a supplement to the PIDM database. However, for the embodiment described in this application, only data from the PIDM database is used.) Other oil and gas well data originates from BJ Services' own proprietary database. BJ Services collects large amounts of information for every well it treats. This information is combined with the information from the PIDM database in database 410.

As used in this document, the terms "well treatment", "treating a well", and the like shall be understood to include any actions one can take to: increase or stabilize the production of a well, make the existing production of a well more efficient, prepare a well to begin producing, shut-in, abandon, or kill the well, or perform a job to comply with regulatory or safety requirements. Thus, the term "treatment" is not limited to a specific type of operation one can perform on a well, but includes the entire range of actions one can perform on a well related to the production of petroleum products from that well.

Also, the term "well data" should be understood to include any type of data or information which can be measured, estimated, or inferred about an existing or future well. Examples of "well data" include information about: the field where the well is located, the reservoir which the well is draining, geological information (e.g., information relating to the lithology, mineralogy, and stratigraphy of the reservoir), the well's drilling and completion history, the well's workover history, downhole equipment in the well, wellbore equipment, the tubular configuration of the well, nearby wells, and the field or unit. Well data includes both information about the physical characteristics of the well, as well as economic, production, completion, and historical data concerning the well, field, or unit.

The combined information in database 410 can ultimately includes a variety of well data. The present invention provides a framework which can store almost any piece of data relating to a well, and allow for its orderly retrieval and processing. SDE 408 manages all of the information in database 410 in such a manner that a user is not aware that the information originated from several different sources. When a request for information about a certain area is received, SDE 408 presents the information in a single format to GIS interface 404.

It will be appreciated by those skilled in the art that the block diagrams of work station 404 and server 412, shown in FIG. 4, are in a simplified format. An actual network of work stations and servers according to the present invention would be much more complicated than the example shown in FIG. 4. For instance, there would be many more workstations and several more servers, with database 410 being distributed across the servers to increase the rate at which data can be communicated to the work stations.

Figure 8:
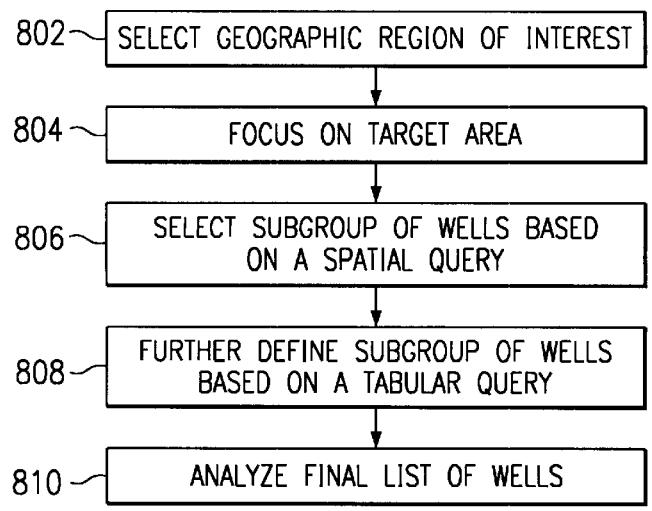
FIG. 8 is a flow chart illustrating a method according to the present invention.

FIG. 8 illustrates a method by which one can use the system shown in FIG. 4 to determine the best treatment for an existing or future well (hereinafter referred to as "the target well"). Initially, a geographic region of interest is selected (802). For instance, one may choose the state of Texas from the rest of the United States. Next, the user continues to shrink the selected area of interest by progressively "zooming in" to the appropriate area within the state of Texas where the target well is located (804). The GIS software assists this process by giving the user more details about the area currently being displayed each time the amount of area being displayed is decreased. Once the user has shrunk the area of interest to a small area, the GIS software will display the individual oil and gas wells in the area. The user can select how these wells are to be displayed. For instances the user can have the GIS software display all of the wells in an area as a series of dots, with the larger dots representing wells that are producing the most oil, and the smaller dots representing wells which are producing the least amount of oil. The wells can be displayed according to any of the various well data types.

Alternately, if a user knows the specific location of a well, they may enter that information directly and the GIS software will display the area immediately surrounding the well. For example, if the user knew the unique number of a well, that number can be directly entered and the GIS interface will automatically select the appropriate scale in which to display that particular well, in addition to the surrounding wells.

After the target well and the surrounding wells have been displayed, a subgroup of the displayed wells is selected (806). This subgroup of wells is normally selected according to how far they are away from the target well. For example, the user can specify that all of the wells within a certain distance of the target well be selected, or the user can draw a line around several wells, thereby selecting all of the wells inside the line. Also, the user can manually select the wells to be included in the subgroup.

It is desirable to form a subgroup of wells which surround the target well because it has been shown that wells in a given area often share important characteristics and have similar reactions to various treatments. Thus, the reaction of a well, located near the target well, to a given treatment is highly predictive of how the target well would react to the same treatment.

Next, a user invokes additional filtering routines which are built into the GIS interface to further refine the original subgroup of wells (808). These filtering routines are invoked using structured query language (SQL) instructions. The original subgroup of wells may need to be narrowed to remove wells which are not sufficiently similar to the target well. For instance, if the target well is a deep oil well, techniques used to increase the production of nearby shallow gas wells may not be of importance. The SQL functions can search or filter wells using any type of well data which is stored in the database for a given well.

Once the subgroup of wells has been sufficiently narrowed a final list of wells and and well data is displayed, the user can review the final list of wells to determine how surrounding wells have been treated and which types of treatments worked best to increase production (810). If the resulting list is too narrow, the user can broaden the search to other geographic areas by repeating steps 802 through 808. This process can be repeated until the user is satisfied that he has compiled a list of relevant wells. The final list of wells provided to the user in step 810 can be of great assistance to the user in rendering a decision on how to treat the target well. The final list contains wells which have similar characteristics to the target well and a detailed report on which treatments have been used on these wells and the effectiveness of these treatments. After analyzing how these wells have been treated, the user can render an opinion as to what types of treatments should be employed on the target well.

In some situations, a user may wish to skip directly to step 808. Starting the process at step 808 allows a user to conduct SQL searches of all of the wells in the database, without having to form a subgroup of wells that are located near the target well. Operating in this manner may be appropriate when a user wishes to examine all wells which have particular characteristics, instead of only searching for wells located around the target well with those characteristics.

The method and apparatus described above find particular use in determining how to stimulate an existing well in order to enhance its production. In most situations, one can examine surrounding wells of similar types which have been stimulated to determine what type or types of production enhancement treatments are the most cost efficient and effective. As an example of the method described above, assume one is trying to decide upon the best production enhancement treatment for a well at location "X." Initially, the user would use the GIS interface to display the well at location X, as well as the surrounding wells. Next, the user would select some number of the surrounding wells to be included in an initial subgroup of wells. The user exercises his discretion in deciding which wells to include in this initial subgroup. For instance, the user may specify that all the wells within a ten mile radius of the well at location X be included in the subgroup.

Once the initial subgroup of wells is determined, the user can further refine this group of wells to select the most relevant wells by conducting SQL searches of the subgroup of wells. For instance, if the well at location X is an oil well with a production region in the range of 8,000–10,000 feet, the user may remove all of the gas wells from the original subgroup, as well as all of the other wells which have characteristics which significantly differentiate them from the well at location X. At this point, the user has selected a group of wells which are physically close to the well at location X, and has selected a group of wells which has important similarities to the well at location X. With this final list of wells, the user can review what types of treatments were employed on these existing wells to enhance production. To aid this review, the user can arrange or rank the wells on this final list according to their total output, their efficiency, or any one of a number of statistics or efficiency ratios. The following is a short list of well performance indicators which a user can display to judge the effectiveness of a treatment: the total cost of all pumping service charges; the customer's return on investment; the customer's rate of return; the net present value to the customer; the days required to payout the stimulation treatment; the revenue per barrel of oil used to determine the payout; the revenue per one thousand standard cubit feet of gas used to determine payout; the cost in units, gallons, pounds or cubic feet for every product used on the job; the pretreatment production rates of a well compared to the posttreatment production rates; the cumulative oil produced over a certain time period by a treated well compared to the cumulative oil produced by an untreated well or a well treated in a different fashion; the estimated ultimate recovery of a treated well compared with the estimated ultimate recovery of an untreated well or a well treated in a different fashion, the pounds of proppant per cumulative barrel of oil produced or oil production rate at any point in time, per well; the maximum proppant concentration used per cumulative barrel of oil produced or oil production rate at any point in time; the ratio of any chemical product used per cumulative barrel of oil produced or oil production rate at any point in time; and the correlation of any job procedure parameter per cumulative barrel of oil produced or oil production rate at any point in time for different wells. Those skilled in the art realize that there are many ways to judge the performance of a well treatment other than those mentioned above.

In addition, a user can display this final list of well according to the same production statics or efficiency ratios on the work station. This ability allows the user to visually compare the location and characteristics of the wells on the final list to the target well.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include (as shown in FIG. 2), but are not limited to: (a) information permanently stored on non-writable storage media (e.g. read only memory devices within a computer such as ROM 58 or CD-ROM disks 78 readable only by a computer I/O attachment); (b) information alterably stored on writable storage media (e.g. floppy disks 74 and hard drives 72); or (c) information conveyed to a computer through communication media, such as network 94, and telephone networks, via modem 92. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for optimizing treatment of a target well, comprising:

obtaining well data for a plurality of wells, along with information related to treatment of the plurality of wells;

storing the well data in a data processing system;

selecting a subgroup of wells from the plurality of wells based, in part, on similarities between the well data for each of the plurality of wells and well data for the target well, using a geographic interface;

displaying the well data for the subgroup of wells; and analyzing the well data, along with the information related to the treatment of the wells in the subgroup of wells, to optimize the treatment of the target well.

2. The method as recited in claim 1, wherein the treatment for a well is selected from the list consisting of cementing, acidizing, fracturing, coil tubing operations, operations using production enhancing chemicals, operations using enzymes, use of service tools, use of completion tools, tubular operations, completion operations, and casing operations.

3. The method as recited in claim 1, further comprising:

before the selecting step, focusing on a geographic area by utilizing geographic information supplied by the geographic interface.

4. The method as recited in claim 1, wherein the displaying step includes displaying user-selectable characteristics about the subgroup of wells.

5. The method as recited in claim 1, wherein the selecting step includes selecting the subgroup of wells from the plurality of wells by displaying all of the plurality of wells in a certain geographic area, and using the geographic interface to select the subgroup of wells from the plurality of wells being displayed in the certain geographic area.

6. The method as recited in claim 1, wherein the selecting step includes using a tabular query string to perform a structured query language search of the plurality of wells, thereby forming the subgroup of wells.

7. The method as recited in claim 1, further comprising:

after the selecting step, ranking the subgroup of wells according to a user-specified performance ratio.

8. A method for optimizing treatment for a target well, comprising:

storing public well data in a data processing system;

storing non-public well data in the data processing system, including data related to the treatment of wells;

storing geographic information for geographic areas corresponding to the public and non-public well data;

integrating the public well data, the non-public well data, and the geographic information into a database structure in the data processing system;

retrieving the public well data, the non-public well data, and the geographic information for a given geographic area from the database structure in response to a user query; and graphically displaying the public well data, the non-public well data, and the geographic information for the given geographic area, thereby allowing a user to determine the optimal treatment for the target well.

9. The method as defined in claim 8, wherein the retrieving step includes using a spatial database engine to retrieve the public well data, the non-public well data, and the geographic information from the database structure.

10. The method as defined in claim 9, further comprising:
entering an information request into the data processing system using a geographic user interface, wherein the information request is transmitted to the spatial database engine.

11. The method as recited in claim 8, further comprising:
filtering the public well data, the non-public well data, and the geographic information retrieved from the database structure using a tabular query string to form a filtered list of well data; and
graphically illustrating the filtered list of well data on the data processing system, with each well within the filtered list being displayed according to a value of a user-specified type of well data.

12. The method as recited in claim 11, further comprising:
after the illustrating step, ranking the wells in the filtered list according to a user-specified performance ratio.

13. A method for optimizing treatment for a target well, comprising:
storing well data about a plurality of wells, along with information related to treatment of the plurality of wells, in a database structure contained in a data processing system;
selecting an initial group of wells from the plurality of wells using a geographic interface operating on the data processing system;
filtering the initial group of wells using user-specified filtering criteria to create a final group of wells; and
displaying the final group of wells and related well data using the geographic interface, wherein a user can optimize the treatment for the target well.

14. The method as recited in claim 13, wherein the selecting step and filtering step are repeated in succession until the final group of wells contains enough wells to accurately analyze the well data for the final group of wells.

15. The method as recited in claim 13, further comprising:
before the selecting step, focusing on a geographic area by utilizing geographic information supplied by the geographic interface.

16. The method as recited in claim 13, wherein the displaying step includes displaying user-selectable characteristics about the final group of wells.

17. The method as recited in claim 13, wherein the selecting step further includes selecting the initial group of wells based upon their distance from the target well.

18. The method as recited in claim 13, wherein the filtering step includes using a tabular query string to perform a structured query language search of the initial group of wells, thereby forming the final group of wells.

19. The method as recited in claim 13, further comprising:
ranking the final group of wells according to a user-specified performance ratio.

20. A data processing system for optimizing the treatment of wells, comprising:
a server having a data storage device;
a workstation having a video display unit, the workstation being connected to the server;
the server and workstation being operable in a first mode of operation, wherein,
well data for a plurality of wells is stored in the data storage device, along with information related to treatment of the plurality of wells;
a user selects a subgroup of wells from the plurality of wells displayed on a video display unit based, in part, on similarities between the well data for each of the plurality of wells and well data for the target well; and
the server transmits the well data for the subgroup of wells to the workstation, thereby allowing the user to analyze the well data, along with information related to the treatment of the plurality of wells, for the subgroup of wells to optimize the treatment for the target well.

21. The data processing system as recited in claim 20, wherein the first mode of operation further includes the server supplying geographic information to the user via the video display unit, wherein the geographic information enables the user to focus on a geographic area by utilizing the geographic information.

22. The data processing system as recited in claim 20, wherein the first mode of operation further includes the workstation displaying user-selectable characteristics about the plurality of wells.

23. The data processing system as recited in claim 20, wherein the first mode of operation further includes the workstation displaying all of the plurality of wells in a certain geographic area and recording the first subgroup of wells selected by the user from the certain geographic area.

24. The data processing system as recited in claim 20, wherein the first mode of operation further includes the server searching the plurality of wells using a tabular query string entered by the user on the workstation.

25. The data processing system as recited in claim 20, wherein the first mode of operation further includes the workstation displaying the wells in the subgroup after they have been ranked according to a user-specified performance ratio.

* * * * *